350-315
2/16/82     XR    4,315,691    SR

United States Patent [19]
Perkins et al.

[11] 4,315,691
[45] Feb. 16, 1982

[54] CAM AND FOLLOWER ARRANGEMENT

[75] Inventors: Charles V. Perkins, Cambridge; John R. Firth, Silverstone, both of England

[73] Assignee: Pye Electronic Products Limited, Cambridge, England

[21] Appl. No.: 124,881

[22] Filed: Feb. 26, 1980

[30] Foreign Application Priority Data

Mar. 2, 1979 [GB] United Kingdom ............... 07535/79
Mar. 5, 1979 [GB] United Kingdom ............... 07615/79

[51] Int. Cl.³ .................... G01J 3/12; F16H 53/06; G02B 7/00
[52] U.S. Cl. ........................... 356/331; 74/569; 350/315; 356/334
[58] Field of Search ............... 74/569; 350/315; 356/319-325, 328, 331-334

[56] References Cited
U.S. PATENT DOCUMENTS 3,614,227 10/1971 George et al. ............... 356/334
4,082,461 4/1978 Mould ....................... 356/332

FOREIGN PATENT DOCUMENTS 1390607 4/1975 United Kingdom ............... 74/569

Primary Examiner—F. L. Evans
Attorney, Agent, or Firm—Robert T. Mayer; Bernard Franzblau

[57]       ABSTRACT

A cam and follower arrangement in which the cam consists of a track carried by a rotatable member. The track has one or more abrupt directional transitions (17) and the follower (17) is biassed to engage one wall or the other (21) of the track (21) appropriate to the direction of rotation of the member by means including a direct-current electric motor operated in a stalled condition. The arrangement may be employed in a monochromator for spectrophotometric apparatus to drive a filter-holder to position one of a number of optical filters arranged in the incoming beam of light.

8 Claims, 3 Drawing Figures

CAM AND FOLLOWER ARRANGEMENT

The present invention relates to apparatus including cam and follower arrangements and particularly to means enabling a follower to follow a cam track in or upon a rotatable member when the track has one or more abrupt directional transitions in it.

In such an arrangement the track may take the form of a parallel-sided channel in or on the face of the rotatable member, or of a rail mounted upon the face of the rotatable member. In the case of the channel the follower is commonly a pin or peg engaging in the channel and in the case of the rail the follower is a U-shaped element sitting upon and engaging the rail.

In such apparatus where the track includes one or more abrupt directional transistions it is common practice to apply a mechanical bias to the follower to cause the follower to engage one or the other wall of the track, dependent upon the direction of rotation of the rotatable member, to enable the follower to follow the abrupt transitions rapidly and not to become engaged therein.

The necessary mechanical bias has commonly been provided by springs and such apparatus has hitherto employed complex mechanical linkages for sensing the direction of rotation of the rotatable member and reversing the bias upon the follower in an appropriate manner.

The need for such apparatus can commonly arise in spectrophotometric equipment where, for example, a series of elements may have to be introduced in succession into a light beam with a negligible time of transition from element to element, calling for abrupt directional transitions in the cam track, and where the apparatus is required to be run in either direction.

It is an object of the present invention to provide simpler and cheaper means for applying a mechanical bias to the cam follower in a direction dependent upon the direction of rotation of the rotatable member.

The invention provides a cam and follower arrangement in which the cam is a track carried by a rotatable member and engaged by the cam follower, the track having one or more abrupt transitions in it, and in which a mechanical bias is applied to the follower to cause it to engage with one or the other of the walls of the track dependent upon the direction of rotation of the rotatable member. The invention is characterised in that the bias is applied to the follower by means including a direct current electric motor operating in a stalled condition, the polarity of the energising voltage applied to the motor being dependent upon the direction of rotation of the rotatable member.

This results in a simplification of the mechanical construction and the elimination of complex mechanical linkages hitherto employed to sense the direction of rotation of the rotatable member and to reverse the mechanical bias upon the cam follower.

The invention also provides spectrophotometric apparatus including such a cam and follower arrangement.

The invention also provides a monochromator having a device bearing a plurality of optical elements and means for driving the device to position one or the other of said optical elements in the path of a light beam traversing the monochromator characterised in that the driving means for the device includes such a cam and follower arrangement.

The device may advantageously be a positionable filter-holder and the optical elements filters.

A preferred example of a cam and follower arrangement in accordance with the invention will be described with reference to the accompanying drawings in which.

Figure 1:
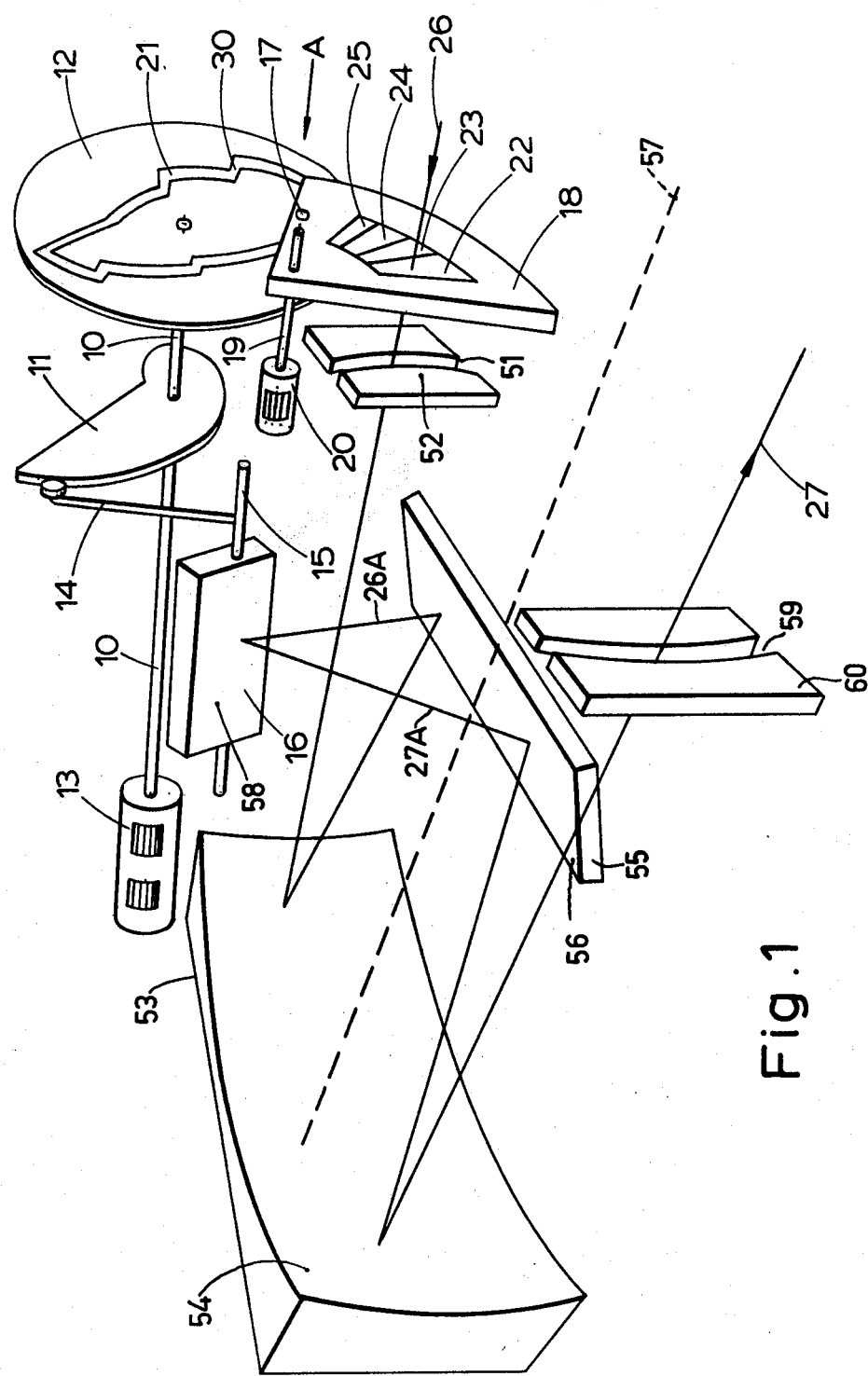
FIG. 1 shows a diagrammatic perspective view of a monochromator for spectrophotometric apparatus employing a cam and follower arrangement according to the invention.

Referring to FIG. 1, a monochromator includes an entrance slit 51 formed in a slit plate 52; a plano-concave spherical collimator mirror 53 with a reflective surface 54; a plane mirror 55, with a reflective surface 56, mounted upon the central optical axis 57 of mirror 53 and inclined to it; a plane diffraction grating 16 mounted for rotation about an axis, coincident with a shaft 15, parallel to the grooves upon the active face 58 of the grating and parallel to the central optical axis 57 of mirror 53; and an exit slit 59 formed in a slit plate 60. Slit plates 52 and 60 lie in, or in a plane closely adjacent and parallel to, the focal plane of mirror 53 and slits 51 and 59 are disposed about the circumference of a circle centered upon the central optical axis 57 of mirror 53, the so-called Ebert circle.

From a suitable source (not shown) a beam of light is brought to a focus in slit 51 and is collimated by mirror 53, reflected from mirror 55 and then falls upon the active face 58 of plane diffraction grating 16. The dispersed beam from the diffraction grating 16 falls upon mirror 55 and is reflected on to mirror 53 and brought to a focus in the plane of exit slit 59. The line 26 is the optical centre line of the beam of light coming into the monochromator through the entrance slit 51 and the line 27 is the optical centre line of the beam of light emerging from the monochromator through the exit slit 59.

The plane mirror 55 is inclined at 45° to the central optical axis 57 and deflects both the collimated beam from mirror 53 and the dispersed beam from grating 16 through 90°. The mirror 55 is thus positioned relative to the grating 16 and to concave spherical mirror 53 such as to ensure that the plane defined by the optical centre line 26A of the collimated beam from mirror 55 and the optical centre line 27A of the dispersed beam from grating 16 intersects the grooves of grating 16 at right angles.

Referring again to FIG. 1, a cam-shaft 10 carries a cam 11 and a cam disc 12 and is coupled to a stepping motor 13. Follower arm 14 is linked to shaft 15 carrying diffraction grating 16, and a pin 17 (shown in dotted outline) is mounted upon the rear face of filter-holder 18 which is carried upon a shaft 19 coupled to direct current electric motor 20. The pin engages in a track 21 upon cam disc 12. Filter-holder 18 carries a series of optical filters 22, 23, 24 and 25 for introduction into the incoming light beam 26 to the monochromator. In operation, a drive signal applied to stepping motor 13 causes cam-shaft 10 to rotate thereby rotating cam 11 and cam-disc 12. As cam 11 rotates cam follower 14 will be displaced causing diffraction grating 16 to rotate upon shaft 15 and vary the wavelength of light emergent from the monochromator in beam 27. Pin 17 will follow track 21 in cam disc 12 and at each of the transitions such as 30 in track 21 will cause filter-holder 18 to move to introduce the next filter into the path of beam 26.

Figure 2:
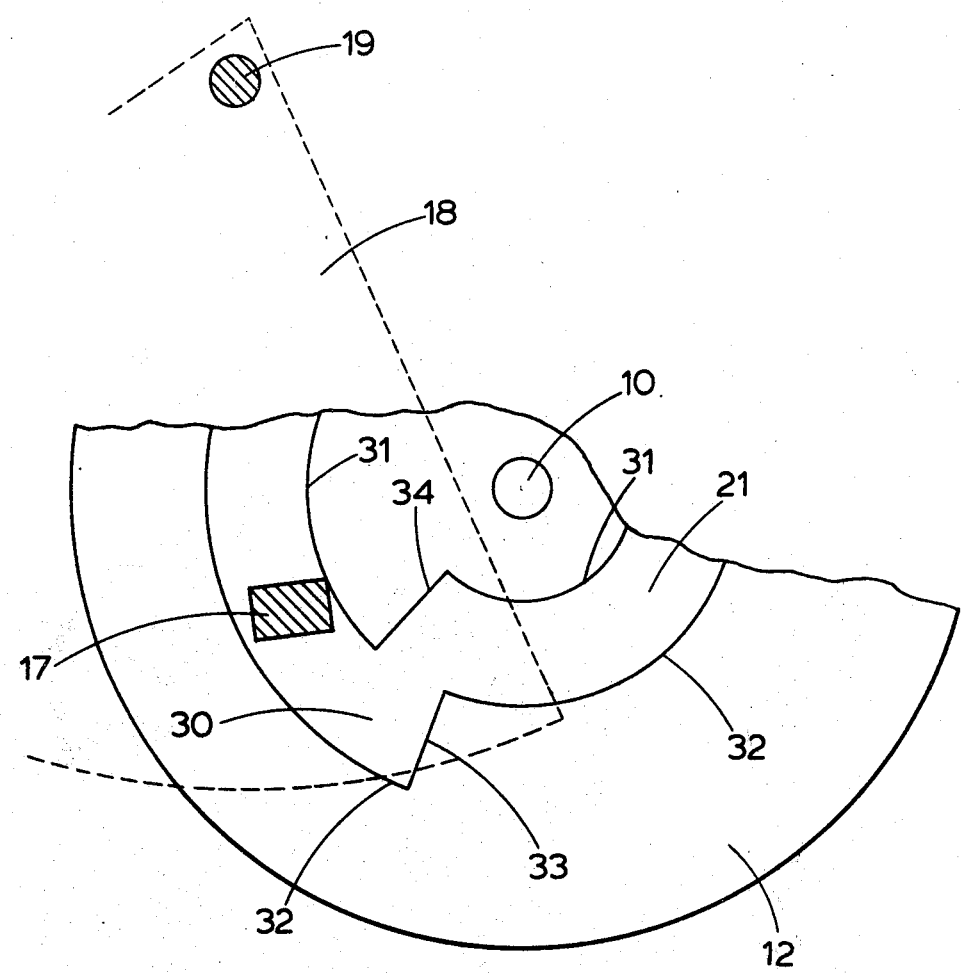
FIG. 2 shows in elevation an enlargement of a portion of the cam disc shown in FIG. 1, looking in the direction indicated as A.

It will be apparent from FIG. 2 that filter-holder 18 has to be biassed to cause pin 17 to engage either side wall 31 or side wall 32 of track 21 to enable pin 17 to negotiate the abrupt directional transitions such as 30 in track 21. For example, if cam-shaft 10 rotates clockwise, pin 17 must be biassed to engage wall 31, to enable pin 17 to rapidly negotiate the transition 30 as disc 12 rotates, to engage wall 31 in the next circumferential portion of track 21, and, more importantly, to prevent pin 17 from becoming engaged against wall 33 of transition 30.

To provide the necessary bias to cause pin 17 to bear against wall 31 of track 12 when shaft 10 rotates clockwise, shaft 19 is rotated anti-clockwise by means of the small direct-current motor 20.

When shaft 10 is rotated anti-clockwise pin 17 must bear upon outer wall 32 to enable the transitions such as 30 of track 21 to be negotiated by pin 17, and to prevent engagement between pin 17 and wall portions such as 34 of transition 30.

To provide the necessary bias to cause pin 17 to bear against wall 32 when shaft 10 rotates anti-clockwise, a clockwise turning movement is applied to shaft 19 by motor 20.

Figure 3:
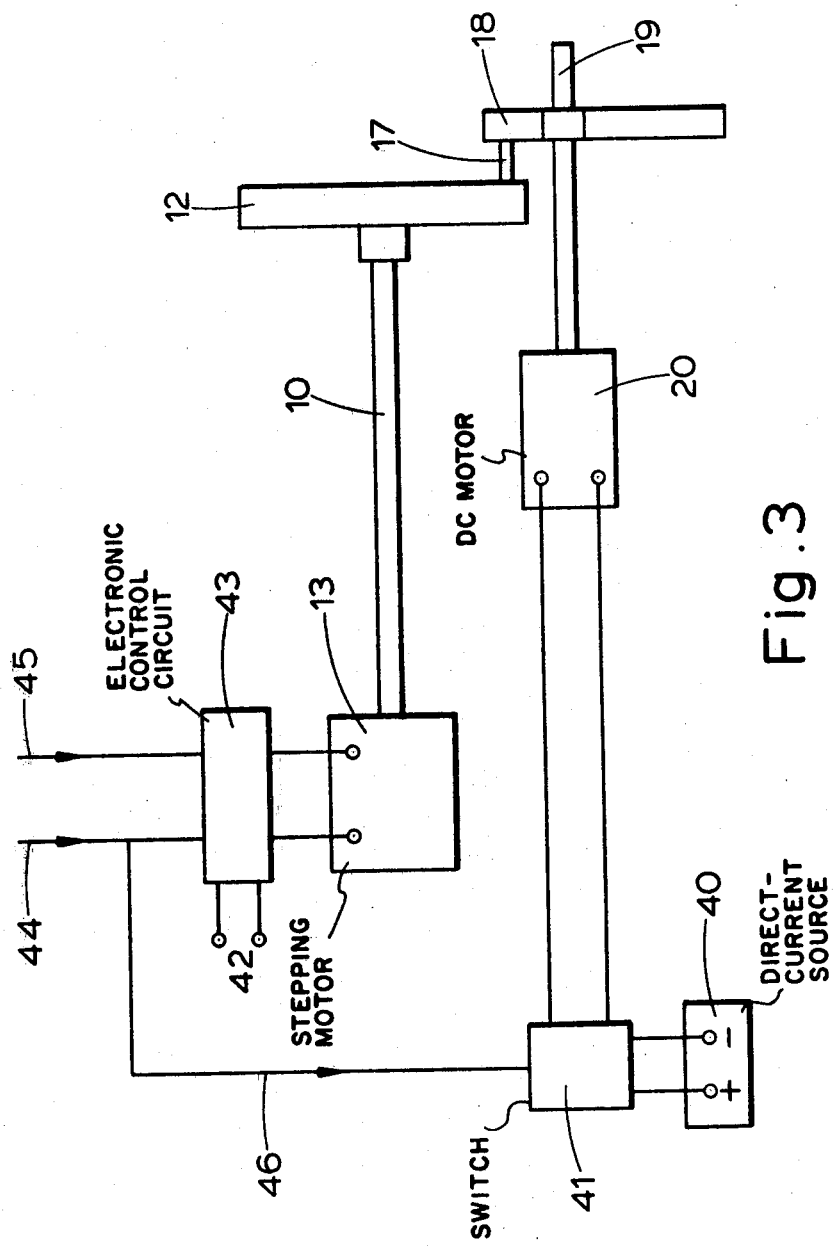
FIG. 3 shows diagrammatically the control system for application of a mechanical bias to the cam follower of FIG. 1.

The direction of the turning moment applied to shaft 19 by direct current electric motor 20 is determined by the polarity of the voltage applied to the motor from a source of power. FIG. 3 shows a control circuit for varying the polarity of the voltage applied to motor 20 in dependence upon the direction of rotation of cam-shaft 10 upon which disc 12 is carried.

Motor 20 is connected to a source of direct-current 40 through an electronic current-reversing switch 41. Stepping motor 13 is connected to a power source (not shown) through terminals 42 of associated electronic control circuit 43. "Sense" and "Drive" signals may be applied to control circuit 43 through leads 44 and 45 respectively and a reversing signal to switch 41 through lead 46, connected to lead 44.

By appropriate inter-connection, a sense signal incoming on lead 44 which would cause stepping motor 13 to rotate shaft 10 clockwise, would also drive switch 41 to connect direct-current source 40 to motor 20 with a polarity such as to cause shaft 19 to turn anti-clockwise, to cause pin 17 to bear against wall 31 of track 21.

Reversal of the sense signal to control circuit 43 would cause stepping motor 13 to rotate shaft 10 anti-clockwise would and likewise cause switch 41 to reverse the polarity of the direct-current supply from source 40 to motor 20, thereby to cause a clockwise turning moment to be applied to shaft 19.

Electric motor 20 must be energised whenever cam-shaft 10 is rotated to ensure that the necessary bias is applied to pin 17 to cause pin 17 to engage the wall of track 21 appropriate to the direction of rotation of cam disc 12. Motor 20 is therefore required to operate in a stalled condition without destructive overheating of the windings. We have found that optimum operating conditions are determined in any particular application by trial and experiment, the principal requirements being to obtain sufficient torque for the application without dangerous overheating of motor 20.

By reducing the applied voltage to a value substantially below that specified for normal operation we have found it possible to use small direct-current motors in a stalled condition for mechanical biassing of cam and follower arrangements, as described herein.

By way of example, in a monochromator such as is described with reference to the drawings, we employ a 12 volt direct-current electric motor rated at 4.8 watts to provide mechanical bias for cam follower pin 17, during the rotation of cam disc 12, by operating the motor with an applied voltage of 3.5 volts and a total power consumption of 0.9 watts, without noticeable overheating or other deterioration.

Although the invention has been described with reference to drive arrangements for a filter-holder for a monochromator, the invention may equally well be used to position other optical elements within a monochromator or other spectrophotometric apparatus. For example it is known to provide a series of pairs of entrance and exit slits for such a monochromator upon a positionable lamina or laminae, as apertures therein.

The lamina or laminae may be positioned to introduce into the incoming and outgoing light beams one or the other of the pairs of slits, appropriate to the wavelength of the light emerging from the monochromator, by means of a drive arrangement including a cam and follower in accordance with the invention.

We claim:

1. A cam and follower arrangement comprising, a cam, a cam follower, the cam comprising a track carried by a rotatable member and engaged by the cam follower, the track having walls and with one or more abrupt transitions in the track, means for applying a mechanical bias to the cam follower to cause it to engage with one or the other of the walls of the track dependent upon the direction of rotation of the rotatable member, the bias applying means including a direct-current electric motor operating in a stalled condition, and means for controlling the polarity of the energising voltage applied to the motor as a function of the direction of rotation of the rotatable member.

2. An arrangement as claimed in claim 1 wherein the bias applying means includes a shaft for mechanically coupling the rotor of the motor to the cam follower.

3. An arrangement as claimed in claims 1 or 2 wherein said voltage polarity controlling means comprises a current-reversing switch coupling the terminals of a source of d.c. current to input terminals of the direct-current motor.

4. An arrangement as claimed in claim 3 further comprising a second reversible motor mechanically coupled to the rotatable member, and means for applying a direction of rotation control voltage to the second motor and to the switch so as to simultaneously control the direction of rotation of the second motor and the direction of the torque produced by the direct-current motor.

5. An arrangement as claimed in claim 1 wherein the cam comprises a disc-shaped member having said track formed on one flat surface thereof and said cam follower is rotatably mounted to pivot about an axis aligned with a shaft of the direct-current motor.

6. An arrangement as claimed in claim 1 wherein said voltage polarity controlling means comprises a current-reversing switch coupling the terminals of a source of d.c. current to input terminals of the direct-current motor and the bias applying means includes a shaft for rigidly coupling the rotor of the motor to the cam follower.

7. A monochromator comprising, means for passing a beam of light through the monochromator, a device supporting a plurality of optical elements, and means for driving said device to position a selected one of said optical elements in the path of a light beam, and wherein said driving means comprises, a rotatable member supporting a cam having a surface that includes a track formed by walls with the track having at least one abrupt transition therein, a cam follower in engagement with the track, means including a direct current motor operative in a stalled condition for mechanically biasing the cam follower against one or the other of the walls of the track dependent upon the direction of rotation of the rotatable member, and means for controlling the polarity of the energizing voltage applied to the motor as a function of the direction of rotation of the rotatable member.

8. A monochromator in accordance with claim 7 wherein the supporting device comprises a filter-holder and the optical elements are filters.

* * * * *

UNITED STATES PATENT AND TRADEMARK OFFICE
CERTIFICATE OF CORRECTION

PATENT NO. : 4,315,691

DATED : February 16, 1982

INVENTOR(S) : Charles V. Perkins Et Al

It is certified that error appears in the above—identified patent and that said Letters Patent is hereby corrected as shown below:

In the Title Page, [57] Abstract,

Line 3 delete --(17)--

Line 4 delete --(17)--

Line 5 delete --(21)-- both occurrences

Signed and Sealed this

Twenty-third Day of November 1982

[SEAL]

Attest:

GERALD J. MOSSINGHOFF

Attesting Officer — Commissioner of Patents and Trademarks